April 22, 1924.
H. S. HOLBROOK
ELECTRICAL SYSTEM
Filed June 17, 1921
1,491,402
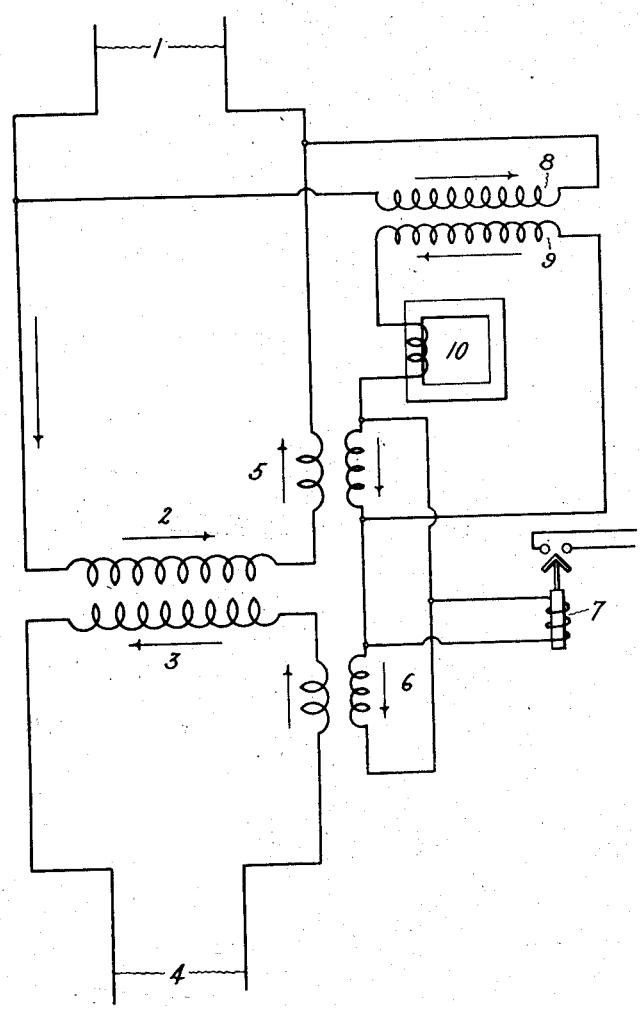
Inventor:
Henry Stanley Holbrook.
by Albert G. Davis
His Attorney Patented Apr. 22, 1924.

1,491,402

UNITED STATES PATENT OFFICE.

HENRY S. HOLBROOK, OF RUGBY, ENGLAND, ASSIGNOR TO GENERAL ELECTRIC COMPANY, A CORPORATION OF NEW YORK.

ELECTRICAL SYSTEM.

Application filed June 17, 1921. Serial No. 478,406.

*To all whom it may concern:*

Be it known that I, HENRY STANLEY HOLBROOK, a subject of the King of Great Britain, residing at Rugby, in the county of Warwickshire, England, have invented certain new and useful Improvements in Electrical Systems, of which the following is a specification.

My invention relates to electrical systems, and particularly to those having transformers therein, and has for its general object an improved arrangement of parts for protecting the transformers against internal faults.

In a type of protective system commonly used to this end a circulating current is employed; there being a current transformer on the primary side of the main transformer and a current transformer on the secondary side. The secondary windings of these two current transformers are connected in series and are traversed by the circulating current. Their ratios of transformation are proportioned to that of the main transformer so that they give the same secondary current on the assumption that the main transformer has no losses. A trip coil or relay is connected in shunt across the two secondaries and no current passes through this tripping circuit so long as the ratio of the current input and current output of the main transformer remains constant. This ratio is of course upset if an internal fault occurs in the main transformer and a differential current corresponding to the fault current will flow through the relay or trip coils and disconnect the main transformer from the circuit.

As hitherto arranged a very positive limit has existed with regard to the minimum value of the fault current required to operate the tripping mechanism. The current input to the main transformer must always exceed the current output multiplied by the turn ratio of the windings, by the exciting current required to produce the working flux in the main transformer core, and required also to provide for losses of the main transformer. In consequence a differential current always flows in the tripping circuit so that it is necessary to bias the tripping device against operation. Obviously, the discrepancy between input and output current is not constant but varies with the magnitude and power factor of the load. The necessity for biasing the tripping device cannot, therefore, be removed by adjustment of the ratio or balance of the current transformer.

A further limit has also existed in the system above referred to by reason of the "kick" or rush of magnetizing current which occurs when voltage is switched on to a modern power transformer, the magnitude of this kick depending on the magnetic condition of the core when the transformer was switched out of circuit. As this rush of current flows through one current transformer only, it produces a current in the tripping circuit.

One method at present employed for preventing the operation of the automatic circuit breaker by reason of the two effects, above referred to, is to shunt the tripping circuit with a "kicking" fuse. This, however, has the great disadvantage of increasing the fault setting required by the relay.

By my invention the need for a kicking fuse is entirely done away with and also with the corresponding need for increased mechanical bias, since I make use of electrical means for neutralizing the no-load differential current that would normally flow in the tripping device. This I accomplish by connecting a reactor in parallel with the primary of the main transformer with suitable connections for the primary current transformer.

For a more complete understanding of the nature and objects of my invention, reference should be had to the following detailed description when taken in connection with the accompanying drawing, in which:

The figure is a symbolic representation of an arrangement of parts for protecting a transformer in accordance with my invention.

Referring now to the drawing, 1 denotes the supply mains across which is connected the primary 2 of a main power transformer whose secondary 3 supplies current through the mains 4 to any load. In the primary circuit is the current transformer 5, and in the secondary circuit the current transformer 6, the secondary windings of these current transformers 5 and 6 being connected in series in the manner commonly employed for circulating current protection. Across the circuit including these secondaries is shunted the tripping coil or relay 7 which actuates the automatic circuit breaker or other main protective device, which I have not shown in the interest of clearness as it forms no part of my present invention.

In parallel with the primary 2 of the main power transformer is connected the primary 8 of a potential transformer whose secondary 9 supplies current to the reactor 10 and to the secondary of the current transformer 5 which is in the primary circuit of the main power transformer.

The potential transformer shown is not necessary though preferable, since by its use the reactor 10 may be made as small as desired.

In the practice of the present invention it is preferable (on account of the voltampere characteristic of transformer steel not being a straight line) to design the reactor to operate at the same flux density as the power transformer. It is also desirable to build the reactor core with the same quality steel as used in the core of the main transformer, and for the magnetic circuit of the reactor to be proportioned to that of the main transformer in such a manner that the current taken by the reactor bears a constant ratio to the current taken by the power transformer, whatever the value of the voltage applied to the circuit, and whether it be applied gradually or suddenly.

In operation it is seen that the reactor 10 connected as shown substantially neutralizes the no-load differential current which would otherwise flow to the tripping device at 7. The arrows, which denote the direction of current in the secondaries of the transformers 5 and 6 at the instant of reckoning, indicate this current as traversing these secondaries in series. Neglecting for the moment the no-load primary current in the main transformer, the currents in the secondaries of transformers 5 and 6 would be equal, assuming that their ratios of transformation are properly proportioned; consequently this circulating current would consume all the secondary E. M. F.'s of these transformers so that there would be under these circumstances no resultant difference tending to cause current to flow in the circuit of the tripping device.

As pointed out above, however, the no-load primary current of the main transformer does induce normally a resultant difference in these secondary E. M. F.'s which will cause current to flow in the circuit of the tripping device at 7 against which the device must be biased unless compensated for in some manner.

The reactor 10, which is in series with the secondary of transformer 5 and that at 9 of the potential transformer, effects this compensation. As a consequence of these connections, when the reactor is proportioned as above indicated, current will flow in series through the secondaries at 5 and 9 and through the reactor which will consume the resultant differential E. M. F. at 5 so that there is substantially no tendency for current to flow in the circuit to the tripping device at 7 under normal conditions or when no fault occurs.

The need for kicking fuses is thus entirely dispensed with in this arrangement, while the limit of sensitiveness of the system becomes the characteristic of the relay or tripping coil at 7.

As will be readily understood this protective system is equally as applicable to polyphase transformers as to single phase transformers.

Having now described an embodiment of my invention which is at present the best means known to me for carrying the same into effect, I would have it understood that this is merely illustrative and that I do not mean to be limited thereby to the precise details shown nor restricted in the choice of recognized equivalents except as defined in my claims hereunto annexed.

What I claim as new and desire to secure by Letters Patent of the United States, is,—

1. In electrical systems for protecting transformers and the like, the combination with current transformers having their primaries connected respectively in the primary and secondary circuits of the transformer to be protected and their secondaries connected in series, of a tripping device shunted across the secondary circuit of said current transformers, and electrical means connected across said secondary circuit for substantially neutralizing the normal differential current tending to flow in the circuit of said tripping device.

2. In electrical systems for protecting transformers and the like, the combination with current transformers having their primaries connected respectively in the primary and secondary circuits of the transformer to be protected and their secondaries connected in series, of a tripping device shunted across the secondary circuit of said current transformers, and a reactor connected across said secondary circuit and proportioned so that the current traversing it substantially compensates for that normally tending to flow in the circuit of said tripping device.

3. In electrical systems for protecting transformers and the like, the combination with current transformers having their primaries connected respectively in the primary and secondary circuits of the transformer to be protected and their secondaries connected in series, of a tripping device shunted across the secondary circuit of said current transformers, a potential transformer, and a reactor connected in series with its secondary, the circuit including said reactor being connected across the secondary circuit of said current transformers and having its constants proportioned substantially to compensate for the differential current which normally at no-load tends to flow in the circuit of the tripping device.

4. In electrical systems for protecting transformers and the like, the combination with current transformers having their primaries connected respectively in the primary and secondary circuits of the transformer to be protected and their secondaries connected in series, of an electroresponsive protective device shunted across the secondary circuit of said current transformers, and a reactor in parallel relation with the primary of the transformer to be protected across the secondary circuit of said current transformers whereby substantially to compensate for the differential current tending to flow in the circuit of the electroresponsive device because of a discrepancy in the normal input and output currents of the transformer to be protected and also because of the rush of magnetizing current when the transformer to be protected is connected to a supply circuit.

5. In electrical systems for protecting transformers and the like, the combination with current transformers having their primaries connected respectively in the primary and secondary circuits of the transformer to be protected and their secondaries connected in series, of an electroresponsive protective device shunted across the secondary circuit of said current transformers, a potential transformer having its primary connected in parallel with the primary of the transformer to be protected, and a reactor in circuit with the secondary of said potential transformer across the secondary circuit of said current transformers, whereby substantially to compensate for the differential current tending to flow in the circuit of the electroresponsive device because of a discrepancy between the normal input and output currents of the transformer and also because of the rush of magnetizing current when the transformer to be protected is connected to a supply circuit.

In witness whereof, I have hereunto set my hand this nineteenth day of May, 1921.

H. S. HOLBROOK.

Witnesses:
J. A. FOSTER,
D. WHITE.